United States Patent [19]

Nafisi-Movaghar

[11] Patent Number: 4,996,070

[45] Date of Patent: Feb. 26, 1991

[54] NATURAL FRUIT FLAVOR EXTRACTS
[75] Inventor: Karim Nafisi-Movaghar, Walnut Creek, Calif.
[73] Assignee: Del Monte Corporation, San Francisco, Calif.
[21] Appl. No.: 463,502
[22] Filed: Jan. 11, 1990

Related U.S. Application Data

[63] Continuation-in-part of Ser. No. 369,149, Jun. 21, 1989, and a continuation-in-part of Ser. No. 155,611, Feb. 12, 1988, Pat. No. 4,948,609.
[51] Int. Cl.$^5$ .............................................. A23L 2/02
[52] U.S. Cl. ................................ 426/330.5; 426/425; 426/489; 426/495; 426/655
[58] Field of Search ............... 426/330.5, 425, 655, 426/599, 419, 478, 431, 489, 495

[56] References Cited

U.S. PATENT DOCUMENTS

| | | |
|---|---|---|
| 1,543,948 | 6/1925 | Moore . |
| 1,842,720 | 1/1932 | Harris . |
| 2,023,536 | 12/1935 | Myers ................................ 221/98 |
| 2,087,076 | 7/1937 | Wadsworth ....................... 426/655 |
| 2,110,184 | 3/1938 | Webb .................................. 99/204 |
| 2,283,302 | 5/1942 | Webb .................................. 99/194 |
| 2,473,184 | 12/1947 | Webb .................................. 99/204 |
| 2,587,939 | 3/1952 | Webb .................................. 99/239 |
| 2,712,698 | 7/1955 | Webb ..................................... 34/9 |
| 2,767,556 | 10/1956 | Robinson ................................ 62/6 |
| 2,801,925 | 8/1957 | Fisher ................................. 99/154 |
| 2,848,333 | 8/1958 | Fisher ................................. 99/102 |
| 2,865,758 | 12/1958 | Weckel ............................... 99/102 |
| 2,895,836 | 7/1959 | Lazar ................................. 99/204 |
| 2,901,359 | 8/1959 | Forkner .............................. 99/204 |
| 3,025,169 | 3/1962 | Guadagni ........................... 99/193 |
| 3,043,699 | 7/1962 | Schmalz ................................ 99/85 |
| 3,091,372 | 8/1937 | Moore ................................ 99/204 |
| 3,305,366 | 2/1967 | Sutton ................................ 99/154 |
| 3,365,309 | 1/1968 | Pader ................................. 426/639 |
| 3,754,938 | 8/1973 | Ponting .............................. 99/154 |
| 3,764,348 | 10/1973 | Huxsoll .............................. 426/419 |
| 3,814,821 | 6/1974 | Oliver et al. ....................... 426/265 |
| 3,843,810 | 10/1974 | Fehmerling ........................ 426/204 |
| 3,894,157 | 7/1975 | Gottlieb ............................. 426/268 |
| 3,962,355 | 6/1976 | Yamazaki et al. ................. 426/639 |
| 3,987,208 | 10/1976 | Rahman ............................. 426/326 |
| 4,011,348 | 3/1977 | Farrier et al. ..................... 426/268 |
| 4,055,675 | 10/1977 | Popper et al. ..................... 426/470 |
| 4,110,478 | 8/1978 | Ooraikul ............................ 426/262 |
| 4,298,623 | 11/1981 | Anderson ........................... 426/419 |
| 4,350,711 | 9/1982 | Kahn et al. ........................ 426/102 |
| 4,379,796 | 4/1983 | Gross ................................. 426/489 |
| 4,418,083 | 11/1983 | McKinney et al. ................ 426/242 |
| 4,504,504 | 3/1985 | Gaehring et al. ................. 426/321 |
| 4,514,428 | 4/1985 | Glass et al. ....................... 426/321 |
| 4,542,033 | 9/1985 | Agarwala .......................... 426/321 |
| 4,547,376 | 10/1985 | Silver et al. ....................... 426/102 |
| 4,551,348 | 11/1985 | O'Mahony et al. ............... 426/639 |
| 4,650,686 | 3/1987 | Young et al. ..................... 426/321 |
| 4,713,252 | 12/1987 | Ismail ................................ 426/290 |
| 4,767,630 | 8/1988 | Silver et al. ....................... 426/102 |
| 4,775,545 | 10/1988 | Augustine et al. ................ 426/639 |
| 4,778,681 | 10/1988 | Kuwabara ......................... 426/241 |
| 4,814,190 | 3/1989 | Ismail ................................ 426/102 |
| 4,832,951 | 5/1989 | Chang-Diaz ...................... 426/425 |
| 4,844,931 | 7/1989 | Webb ................................. 426/438 |
| 4,873,095 | 10/1989 | Rundle .............................. 426/495 |
| 4,873,112 | 10/1989 | Mitchell ............................ 426/658 |
| 4,879,127 | 11/1989 | Liu .................................... 426/419 |
| 4,925,686 | 5/1990 | Kastin ............................. 426/330.5 |
| 4,938,971 | 7/1990 | Chapdelaine ..................... 426/640 |

FOREIGN PATENT DOCUMENTS

| | | |
|---|---|---|
| 2712551 | 9/1978 | Fed. Rep. of Germany . |
| 2712560 | 9/1978 | Fed. Rep. of Germany . |
| 2462877 | 3/1981 | France ............................... 426/489 |
| 36373 | 3/1983 | Japan . |
| 59-6834 | 1/1984 | Japan . |
| 6836 | 1/1984 | Japan . |
| 232049 | 11/1985 | Japan . |
| 1056048 | 3/1986 | Japan . |
| 61-288317 | 6/1988 | Japan . |

OTHER PUBLICATIONS

H. I. Sinnamon "Effect of Prior Freezing on Dehydration and Rehydration of Apple Half Segments", Food Technology, Aug. 1968, pp. 101–102.
"Introduction to the Biochemistry of Foods", by J. B. S. Bravernman, Elsever Publishing Company, New York 1963, pp. 208 and 209.
Food Technology titled "Efficacy of Added Ascorbic Acid in the Control of Discoloration of Kraut", by A. Setky et al.
Food Technology, Oct. 1954, "Factors Affecting the Color Stability of Frozen Montmorency Cherries", by Stein et al.
Food Engineering, Dec. 1952, "Better Color, Better Flavor in Processed Mushrooms by Adding Ascorbic Acid", by Baurenfeind et al.
"Prevention of Darkening of Bananas During Dehydration", by J. Feigenbaum et al.
Food Product Development by A. O. Olorunda, May 1977, pp. 44–46.
"Browning of Frozen Apples Prevented", Food Industries, Dec. 1949, pp. 63–65.
"Ascorbic Acid and Meat Color", Food Technology May 1952, pp. 194–196.
Food Dehydration, vol. II Products and Technology 1964, AVI Publishing Company, Inc.
Freeze-Drying of Foods by C. Judson King, Sep. 1970.

Primary Examiner—Carolyn Paden

[57] ABSTRACT

A natural fruit flavor extract is produced by preparing an infusion solution and immersing a fruit in the solution for a period of time to infuse the fruit with the solution. The infusion solution is an aqueous solution containing a disaccharide, an edible acid to inhibit non-enzymatic and enzymatic browning, a reducing agent, an antimicrobial agent and a chelating agent to remove trace metal ions. During infusion, the components of the solution infuse the fruit and components from the fruit diffuse into the solution. After infusion, the solution contains comparatively small amounts of the disaccharide, acid and chelating agents and significant portions of the fruit sugars, colors, flavors and pectins from the fruit. The solution is recovered and used as a flavoring or a sweetener without additional treatment, concentrating or supplementing with additional sweeteners, flavors or colors.

34 Claims, No Drawings

NATURAL FRUIT FLAVOR EXTRACTS

CROSS-REFERENCE TO RELATED APPLICATIONS

This application is a continuation-in-part application of Ser. No. 07/369,149 filed June 21, 1989 and Ser. No. 07/155,611 filed Feb. 12, 1988 which is now U.S. Pat. No. 4,948,609.

FIELD OF THE INVENTION

The present invention is directed to a fruit flavoring solution containing natural fruit extracts, fruit flavors and sugars which may be used as a sweetener. More particularly, this invention relates to a method of producing a fruit flavored solution by treating fruits with an infusion solution used in treating fruits to extract the flavor components, and recovering the solution.

BACKGROUND OF THE INVENTION

Sugars and sugar syrups are used extensively in the food industry to sweeten products such as bakery goods, beverages, canned fruits, vegetables, confectionery products, dairy products, dehydrated foods, meat products, jellies and preserves. The liquid sugars and sugar syrups are particularly desirable where the water content contributes to the desirable properties of the product. Examples of the commonly used liquid sugars include liquid sucrose, liquid brown sugar, invert sugar syrups, molasses, corn syrup and high fructose corn syrup.

Sugar syrups and liquid sugars, when used as sweeteners in food products are often used in combination with a flavoring agent and a coloring agent. Typical flavors may include, for example, artificial fruit flavors, vanilla and cocoa. The fruit flavors used are generally the artificial flavors since the artificial flavors are often less expensive and more stable than the natural flavors. Natural fruit flavors are not used on a large scale due to their high cost of production and the difficulty of processing the fruit. Natural fruit flavors and fruit juices are inherently less stable than most artificial flavors. During storage, natural fruit flavors often result in discoloration and a loss of the characteristic flavor. The unstable nature of conventional fruit extracts and flavors generally requires a large amount of the component to be used, thereby increasing the cost of the final product.

Conventional production of natural fruit flavors and extracts crush the fruit and separate the pulp to recover the juice. The juice may be concentrated or otherwise treated to recover flavor components. This type of process is quite expensive and requires large quantities of fruit to economically produce the fruit flavor.

The known methods of recovering flavor components are not as efficient as in the recovery of flavors from other materials. Some plant materials, including, for example, black pepper and mint, have a high content of aromatic materials which can be easily extracted by the use of organic solvents or by expressing the plant material. Fruit flavors, however, cannot be effectively obtained by expressing the fruit. The flavor components in the expressed liquid are generally of insufficient concentration to be used as a flavor source. In order to obtain a higher flavor intensity, the fruit juice has to be concentrated. This is usually performed by heating to drive off the water. Heating of the fruit juice has the distinct disadvantage of destroying the thermally labile constituents of the flavor components. These thermally labile constituents are usually responsible for the characteristic flavor and aroma of the fruit. Expressing of fruit flavors from the fruit is not effective in recovering fruit flavors since the aromatic flavor components are not very soluble in water. Generally, organic solvents, such as ethyl alcohol, are necessary for effective flavor extraction. The flavors obtained from fruits by conventional methods require storage in frozen or refrigerated containers.

Corn syrup and high fructose corn syrup are the more frequently used sugar syrups due, in part, to the low cost of producing these syrups. In addition, corn syrups are generally shelf stable and some corn syrups are sweeter than sucrose. Corn syrups are also desirable since they tend to impart a desirable texture or body to the food product. For example, corn syrups are suitable for imparting a more acceptable mouth feel in canned fruits and beverages. In ice cream, sherbets and other frozen desserts, corn syrups are used to obtain the desired degree of body and texture. The type of corn syrup and the amount used in these products are determined by the desired qualities of the finished food product. In general, increasing the amount of corn syrup will produce a product of greater chewiness. Corn syrup is typically used in enhancing the chewiness of many types of cookies and other bakery products.

High fructose corn syrup is generally sweeter than standard corn syrup and is therefore used extensively as a sweetener. High fructose corn syrup has basically different properties than standard corn syrup. In high fructose corn syrup, the average molecular weight of the sugar is lower than other corn syrups so that the osmotic pressure will be higher in high fructose corn syrups at the same solids concentration. High fructose corn syrup is often used to promote browning reactions with amino acids and in fermentation processes since nearly 100 percent of the sugars are fermentable.

Corn syrups and corn sugars are produced by chemical or enzymatic hydrolysis of starch. The starch may be derived from any source, although in practice the sugars are almost exclusively produced from milo and corn starches. In recent years the changes in the food industry have resulted in corn syrups which have highly selective properties. There are commercially available syrups which have a variety of carbohydrate compositions with varying degrees of viscosity, sweetness and humectancy.

The hydrolysis of starch for the production of corn syrups is accomplished by three different methods. In manufacturing terminology, the terms "conversion" or "starch conversion" are used to denote these three processes. The selection of the type of conversion method is dependent upon the type of corn syrup that is to be produced. The degree of conversion is usually measured in terms of dextrose equivalent. This term is defined as the percentage of reducing sugars in a corn syrup calculated as dextrose on a dry weight basis.

The three processes of starch hydrolysis are acid conversion, acid enzyme conversion and enzyme-enzyme or multiple enzyme conversion. In the first of these methods the only starch hydrolyzing agent is an acid. In the remaining two processes the use of two hydrolyzing agents is required and these procedures are therefore termed "dual conversion." The purposes of the dual conversion systems are twofold. In the first place, acid conversion produces syrups which have limitations on acceptability when the hydrolysis is carried beyond about 55 DE. Secondly, dual conversion methods make it possible to produce syrups having widely different chemical and physical properties.

Processes of drying fruit or treating fruit to extend its shelf life generally involve immersing the fruit pieces in an infusion solution prior to the drying step. The preparation of infused fruit products has conventionally been carried out by adding fresh fruit to a tank containing a warm concentrated sugar solution or sugar syrup. The sugar solution has a greater amount of dissolved solids compared to that present in the fruit. As a result, osmotic exchange takes place, resulting in the infusion of sugar solids into the cellular portions of the fruit. During osmosis, the sugar diffuses inwardly into the fruit while water contained within the fruit diffuses outwardly through the cell walls of the fruit.

One example of an infusion solution for treating fruits is described in U.S. Pat. No. 4,551,348. The disclosed infusion solution is made up of an aqueous solution of an edible acid and sugar. The solution includes at least 35 percent to 100 percent fructose. The fruit pieces are immersed in the solution for a sufficient period of time to infuse the fruit. The solution is disclosed as being concentrated and mixed with the infused fruit during packaging of the fruit product.

Another method of infusing fruits is disclosed in U.S. Pat. No. 4,350,711. A commercially available corn syrup is used as the infusion solution. The fruit is mixed with the syrup and infused for a sufficient period of time. The fruit is then removed and the syrup is drained. Fruit toppings are reported to be prepared by mixing the infused fruit with a portion of the remaining syrup, along with other additives such as a starch, to produce a fruit topping or fruit sauce.

The methods for infusing fruits and producing dried fruits generally have the disadvantage of using substantial amounts of sulfiting agents to inhibit the non-enzymatic and enzymatic browning of the fruit. Increased public awareness and opposition to the sue of sulfiting agents in fruit and vegetable processing have made these processes less desirable. Sulfiting agents have, however, proven effective in inhibiting oxidative deterioration of the dried fruit by scavaging oxygen. The sulfiting agents have also been effective in inhibiting the growth of microorganisms. As a result, the use of sulfiting agents has continued in spite of the disadvantages of using sulfites.

Various techniques have been tried over the years to preserve dried fruits without having to use sulfiting agents. In U.S. Pat. No. 3,754,938 there is disclosed a technique for preserving apple slices using a solution consisting of ascorbic acid, calcium chloride and sodium bicarbonate. The sodium bicarbonate is added to maintain a pH of 7 to 9 during the treatment period. When this treating solution is used it is disclosed that a sulfiting treatment does not have to be used.

Another method is disclosed in U.S. Pat. No. 3,894,157 where the color of freeze dried carrots is stabilized by a treatment with an antioxidant such as ascorbic acid or erythorbic acid. An aqueous solution containing at least one of these acids is sprayed onto the vegetable. When ascorbic acid is used, the concentration of the acid is about 1 to 3 percent of the solution. The treated vegetable is then freeze dried.

The present invention is directed to a method of producing a natural fruit extract which may be used as a sweetener solution containing the natural fruit flavors and fruit sugars. The method involves the infusion of a fresh fruit with a solution containing a sugar and an edible acid. During the infusion of the fruit, the sugar in the solution replaces the monosaccharide content of the fruit. After the infusion process, the infusion solution contains a portion of the flavors, pectins and sugars from the fruit. The infusion solution is suitable as a sweetener for other processes and the infused fruit may be dried for packaging and later consumption.

SUMMARY OF THE INVENTION

The present invention is directed to a fresh fruit flavor extract and to a method of preparing the extract. The fruit flavor extract is particularly suitable for use as a fruit flavored sweetener solution. The fruit flavor extract is generally in the form of a syrup or aqueous solution obtained from an infusion solution after treating a fresh fruit under controlled conditions. In the production of the extract, a fruit is processed by first peeling, coring, depitting and cutting the fruit into suitable pieces. The fruit pieces are then immersed in an aqueous infusion solution and allowed to steep or soak for a period of time. The infusion solution is generally maintained at a temperature of about 120° F. to about 210° F. for about 5 to 35 minutes. In one embodiment of the invention, the infusion solution is drained from the fruit pieces after a sufficient infusion time. The infused fruit may then be transferred to a subsequent processing stage, such as deaerating at a reduced pressure. In a preferred embodiment, the fruit pieces are subjected to a vacuum while submerged in the infusion solution to deaerate the fruit. The fruit pieces are then separated from the infusion solution and the solution is transferred to a holding vessel for later use.

The fruit being processed may be a fruit which is generally used to flavor comestibles. Examples of suitable fruits include apples, bananas, pineapples, peaches, pears, plums, grapes, apricots, nectarines, blueberries, raspberries and strawberries.

The infusion solution for treating the fruit contains at least one carbohydrate, such as a sugar, an edible organic or inorganic acid, an optional antimicrobial agent and a reducing agent. The infusion solution may further contain an edible chelating agent. The carbohydrate component of the infusion solution is preferably a disaccharide. The concentration of the sugar component in the infusion solution is generally about 0.5% to about 60% by weight, preferably from about 5% to about 50% by weight. Examples of suitable sugars include sucrose, maltose and lactose.

The edible acid may be an organic or inorganic acid, for example, ascorbic acid, erythorbic acid or acetic acid. These ascorbic and erythorbic acids may also serve as reducing agents to inhibit browning of the fruit. Additional acids suitable for adjusting the pH of the solution may be used, including, for example, acetic acid, malic acid, lactic acid, fumaric acid and phosphoric acid. The amount of acid present in the infusion solution is generally sufficient to lower the pH to less than about pH 6 and preferably less than about pH 5.

Additional components may be added to the solution to remove metal ions present in solution, such as, for example, chelating agents. Examples of suitable chelating agents include citric acid, phosphoric acid, phosphates or salts of EDTA. The chelating agent is generally present in an amount of about 0.1 percent by weight to about 0.5 percent by weight of the infusion solution. In the preferred embodiment the chelating agent is present in the amount of about 0.2 percent by weight to about 0.4 percent by weight.

The infusion solution may further contain a suitable anti-microbial agent to inhibit the growth of microorganisms in the infusion solution. Examples of suitable anti-microbial agents include sodium benzoate, potassium sorbate and alkyl parabens. The antimicrobial agent is generally included in the infusion solution in the amount of about 0.01 percent by weight to about 0.5 percent by weight of the infusion solution.

In the process of the invention, the infusion solution is removed from the treated fruit. The spent infusion solution contains a significant portion of the extracted fruit flavors, pectins and sugars from the fruit, while substantial portions of the disaccharide originally in the infusion solution has diffused into the fruit. The spent infusion solution, therefore, contains a substantial portion of naturally occurring components found in the fruit. The spent infusion solution is a highly concentrated solution of fruit flavors. Generally, it is not necessary to concentrate the solution further since the solution has a distinct and intense fruit flavor. As a result of the process of the invention, an intense fruit extract can be obtained without the use of excessive heating or other physical methods typically used in the industry. The solution may be further concentrated, if desired, and filtered to produce a desirable sweetener containing substantial amounts of natural fruit flavor extracts. The solution may be used to sweeten food products, including, for example, baked goods, beverages, canned fruits and confectioneries.

DETAILED DESCRIPTION OF THE INVENTION

In the present invention a fruit extract suitable as a flavorant and as a sweetener is produced containing natural fruit flavors, colors and other fruit extracts. The sweetener is generally in the form of a syrup or aqueous solution. The viscosity or consistency of the sweetener will depend on the concentration of the fruit extracts and sugars present. The fruit flavors, colors, pectins and other fruit extracts make the sweetener particularly suitable for sweetening confectionery products, ice cream, cookies, cakes and other baked goods, jams, jellies, canned fruits and beverages.

In the preferred embodiment of the invention, the fruit flavors are extracted using an infusion solution in treating whole fruits and fruit pieces. In the process of preparing the flavor extract, the fruit pieces are immersed in and infused with an aqueous infusion solution. The fruit is generally heated in the solution to a temperature of about 60° F. to about 212° F. and preferably for about 120° F. to about 210° F. for about 30 seconds to about 1 hour and preferably for about 5 to 35 minutes. The fruit may be deaerated by subjecting the fruit to a reduced pressure. The deaeration step may be conducted while the fruit is submerged in the infusion solution or after the solution has been drained from the fruit.

The fruit, once removed from the infusion solution, is particularly suitable for drying without browning or deteriorating. The fruit is dried by hot air drying, drying in an inert atmosphere, or by vacuum drying. After drying, the fruit is usually stored and packaged in hermetically sealed containers. Air is usually removed by vacuum packaging procedures, purging with an inert atmosphere such as nitrogen, or by the use of an oxygen scavenger. Before packaging, the fruit may be treated or coated with one or more additional sweeteners, sugars, coloring agents or flavorants.

In one embodiment of the process of the present invention, the solution for treating the fruits is prepared and passed through a heat exchanger and delivered into a processing tank. The solution is heated to a temperature of about 120° F. to about 210° F. The solution is continuously circulated between the heat exchanger and the processing tank to maintain a constant temperature. The suitable filter device is placed in the flow between the heat exchanger and processing tank to remove any particulates and pieces of fruit. The fruit pieces are placed in the heated solution preferably for about 5 to 35 minutes. After a sufficient soaking time, the heat source to the heat exchanger is closed and the processing tank is closed. A vacuum may be applied to the processing tank to gradually achieve a pressure of about 1 inch to about 30 inches and preferably about 15 to 30 inches of mercury. During the vacuum treatment, the temperature is generally reduced to about 80° F. to about 180° F. The fruit and solution are maintained at this temperature for about 5 to 30 minutes. The vacuum is then slowly released to bring the pressure up to atmospheric. The fruits are then removed for further processing. A fresh supply of fruit may be placed in the solution and the process repeated through several cycles. The process may be repeated up to about 10 times using the same solution.

The process of the invention has been found to effectively extract flavor components, pectins and other constituents from fruits to produce a thickened flavor extract. The processing steps considered particularly important in extracting the flavors is the vacuum applied to the fruit to remove air from the fruit, the bleeding of air into the processing tank, and the difference between the osmotic pressure of the solution and fruit.

The infusion solution is recovered from the process of treating the fruit for use as a fruit flavor or as a sweetener. During the infusion process, some of the components from the fruit will diffuse into the infusion solution. Examples of components that generally diffuse into the infusion solution include aromatic flavor components, pectins, colors and the monosaccharides from the fruit. The infusion solution may be recycled to treat additional fruit or recovered for use as a fruit flavoring sweetener. The solution may be concentrated or supplemented with additional sugars, flavors or other additives before being recycled to treat additional fruit.

The infusion solution for use in the treating of the fruits is preferably an aqueous solution of at least one sugar, an edible acid, an antimicrobial agent, a chelating agent and a reducing agent. The infusion solution may further contain an optional fruit flavor or fruit juice to complement the fruit flavor being extracted. The fruit flavor or fruit juice may be the same type of fruit to be processed or a blend of different fruit juices and flavors.

The fruit may be a whole fruit or fruit piece that is suitable for processing in the infusion solution. Examples of suitable fruits include apples, peaches, pears, plums, apricots, nectarines, bananas, grapes, pineapples, blueberries, raspberries and strawberries. The fruits to be processed may be whole or cut and sliced into pieces before subjecting to the infusion solution.

The infusion solution is prepared prior to immersing the fruit pieces. The concentration of the components making up the infusion solution is dependent in part on the type of fruit being processed and the amount of fruit to be treated. The concentration of the sugar component is generally about 0.5 percent by weight to about 60 percent by weight. The preferred sugars are the disaccharides having twelve carbons. Examples of suitable sugars include sucrose, maltose, cellobiose and lactose, although other sugars may be used. In the preferred embodiment, the sugar component is a non-reducing disaccharide to reduce the occurrence of non-enzymatic browning reaction of reducing sugars with amino acids.

The edible acid component of the infusion solution is included in an effective amount to adjust the pH of the solution to less than pH 6, preferably to less than pH 5, and most preferably to less than about pH 4.5. The pH of the infusion solution needed is dependent on the type of fruit being treated. The purpose of the pH adjusting agent is to lower the pH of the fruit to a level such that the non-enzymatic browning is inhibited. Proton donating acids are generally preferred to inhibit non-enzymatic and enzymatic browning. Exemplary proton donating acids include citric acid, lactic acid, malic acid, fumaric acid, acetic acid and phosphoric acid. The proton donor acid is generally present in the amount of about 0.25% by weight to about 3.0% by weight, and preferably about 0.5% by weight to about 2.0% by weight of the infusion solution.

Enzymatic browning of the solution and the fruit is counteracted by incorporating a suitable reducing agent into the infusion solution, such as for example, an edible reducing acid. Examples of suitable reducing acids include erythorbic acid, ascorbic acid and sulfurous acid or a salt thereof or other compound that will yield sulfurous acid. The reducing acid component will generally be present in the amount of about 0.1% by weight to about 2.5% by weight of the infusion solution, and preferably about 0.25% to about 1.5% by weight. The precise amounts of the acid components included in the infusion solution will depend on the type of fruit being processed. In addition, the ratio of reducing acid and proton donor acids used will depend on the fruit and its susceptibility to enzymatic and/or non-enzymatic browning.

The infusion solution will generally contain at least one chelating agent that is food acceptable. The chelating agent is included in amounts effective to remove metal ions which may become associated with the fruit and the infusion solution during processing. The processing equipment is typically made of metal or includes many metal components. Contact of the fruit or infusion solution will often result in small quantities of metal being ionized in solution. The metal content may tend to taint the flavor and color of the fruit or infusion solution. Some of the metals may be naturally present in the fruit. Exemplary chelating agents include citric acid, phosphoric acid, EDTA (ethylenediaminetetracetic acid) and salts thereof, pyrophosphates, polyphosphates and sodium hexametaphosphate. The chelating agent is generally present in an amount of about 0.1% by weight to about 0.5% by weight of the infusion solution. When a chelating agent is used, it is preferably present in the amount of about 0.2% by weight to about 0.4% by weight. The actual amount used will depend on the metal ion content of the fruit and the infusion solution. Negligible amounts of metal ions in the fruit or infusion solution generally may be ignored.

The infusion solution may further contain a suitable antimicrobial agent to inhibit the growth of microorganisms in the fruit and in the infusion solution. The antimicrobial agent may be a conventionally used component or substance including, for example, sodium benzoate, potassium sorbate, benzoic acid, sorbic acid, propionic acid, alkyl parabens and salts thereof. These additives are generally included in the infusion solution in a minor amount, usually in the amount of about 0.01% by weight to about 0.5% by weight of the infusion solution.

During the treatment of the fruit with the infusion solution, the disaccharide in the infusion solution diffuses into the fruit while the monosaccharides diffuse from the fruit to the infusion solution. In addition to the monosaccharides, other components are removed from the fruits and diffused into the solution including, for example, flavor components, pectins, and coloring components. The acid antimicrobial agent and chelating component of the infusion solution are substantially taken up by the fruit pieces. In this manner, the fruit pieces are in a condition such that it can be effectively dried and stored without minimal browning. More importantly, the infusion solution, after treatment with the fruit, contains relatively small amounts of the disaccharide, acid and chelating agents and contains comparatively large amounts of the monosaccharides, flavors, colors and pectins from the fruit.

The advantages of using a disaccharide in the infusion solution are two-fold. In one instance, the disaccharide is absorbed by the fruit and replaces the monosaccharide content of the fruit. The substantial removal of the monosaccharides and in particular the reducing sugars such as fructose and glucose reduces the occurrence of non-enzymatic browning typically known as the Maillard reaction. The Maillard reaction occurs between a reducing sugar and the proteins in the fruit. The reaction proceeds through a complicated series of reactions and intermediates to form the pigmented nitrogenous polymers and copolymers. Removing or reducing the content of the reducing sugars and replacing the lost sugars with a disaccharide inhibit browning due to the Maillard reaction without a loss of sweetness of the fruit when dried.

A further advantage of using a disaccharide in the infusion solution is that the resulting spent infusion solution contains the natural fruit flavors, colors, monosaccharides and pectins from the fruit. The spent infusion solution will have minor or negligible proteins present in the solution and will therefore not be as susceptible to the Maillard browning reaction.

In the process of preparing the fruit flavor extract of the present invention, the fruit initially is washed and cleaned. Depending on the size and type of fruit, the fruit is cored, peeled, depitted and cut or sliced into appropriate size pieces. The fruit may be left whole, halved or quartered as necessary. The fruit and fruit pieces may be blanched if desired to deactivate the enzymes in the fruit.

In one embodiment of the invention, the fruit is reduced to suitable size pieces and placed in the infusion solution as described above. The fruit and the solution are maintained at a temperature of less than about 212° F. and preferably about 120° F. to about 180° F. The fruit is steeped and soaked in the infusion solution for a period of time sufficient to have the components of the solution diffuse into the fruit and the fruit components enter the solution. The time to achieve the desired infusion will depend on the type and size of the fruit but will generally range from about 30 seconds to about 1 hour and preferably from about 5 to about 30 minutes.

In an alternative preferred embodiment of the invention, the fruit is first cut into pieces and introduced into the infusion solution at a temperature of about 60° F. to about 212° F. and preferably at a temperature of about 100° F. to about 210° F. In this embodiment of the invention the fruit and the heated solution are maintained at atmospheric pressure for about 30 seconds to 60 minutes and preferably 5 minutes to 30 minutes to infuse the fruit. The temperature is then reduced to less than about 180° F., preferably between 100° F. and about 180° F., and a vacuum is applied to the fruit and the infusion solution. The vacuum is maintained at about inch to about 30 inches of mercury, preferably 15 inches to 30 inches for about 30 seconds to about 60 minutes and preferably about 5 minutes to about 30 minutes. The actual time of the fruit in the infusion solution will depend on the type of fruit flavor being extracted. Generally the total time at atmospheric and at reduced pressure will not exceed about 60 minutes.

The infusion solution is then drained from the fruit and recovered. The process of the present invention is particularly desirable since the fruit may be dried for later consumption after the solution has been recovered. The fruit may be dried at atmospheric temperature to a water content of about 10% by weight to about 60% by weight, and preferably to about 15% by weight to about 45% by weight. The drying is generally conducted in an air drying chamber using a stream of heated air at a temperature of about 30° C. to about 80° C. and preferably about 35° C. to about 75° C. The time for drying is generally about 1 to 10 hours, and usually about 2 to 6 hours.

The fruit pieces generally are dried by placing the fruit on a tray in the drying chamber. This air drying can be conducted in the vacuum chamber with the vacuum chamber maintained at atmospheric pressure or subatmospheric pressure. In one embodiment the fruit is placed within the chamber for air drying and the chamber is heated to a temperature of about 35° C. to about 70° C. and maintained at atmospheric pressure. The fruit is maintained in the drying chamber at atmospheric pressure for a predetermined period of time and then the vacuum is applied. The temperature of the vacuum chamber is generally maintained at about 50° C. to about 125° C. during vacuum drying. A vacuum of about 5 to 28 inches of mercury is generally maintained during the second drying step.

When the temperature difference between the temperature of the fruit narrows to less than about 5° C., and preferably less than about 3° C. the vacuum chamber is cooled to less than about 40° C. and preferably less than about 30° C. and the chamber returned to atmospheric pressure. The dried fruit is then removed from the vacuum chamber and packaged. The moisture content of this product is generally less than about 5% by weight and usually to less than about 3% by weight.

In an alternative embodiment of the invention, the fruit is cut into pieces and introduced into the infusion solution at a temperature of about 60° F. to about 212° F. and preferably at a temperature of about 100° F to about 210° F. In this embodiment the fruit and the solution are maintained at atmospheric pressure for a period of about 30 seconds to about 60 minutes, and preferably about 5 minutes to about 30 minutes. The fruit is then removed from the solution and deaerated by placing the fruit under a vacuum of about 1 inch to about 30 inches of mercury and preferably about 20 to 30 inches of mercury for about 5 to 30 minutes. The fruit may then be dried by heated air in the manner as discussed above.

The fruit may be packaged after it has been dried to a suitable moisture level. The preferred form of packaging material is an oxygen impermeable material. The package is generally evacuated or purged with an inert gas such as nitrogen, carbon dioxide, argon, neon, or helium, and then the package is sealed.

The infusion solution is separated from the fruit after soaking the fruit. The infusion solution may then be transferred to a holding vessel where it can later be treated and packaged. Since the solution contains significant amounts of sugars from the fruit, as well as fruit flavors, the solution is particularly suitable as a flavor and sweetener solution. The infusion solution as it is removed from the fruit may be filtered to remove any solids which may be present. In the preferred embodiment of the invention, the infusion solution is used as a sweetener without further treatment since the fruit flavors are intense. Alternatively, the infusion solution may be further concentrated or supplemented with additional sweeteners, flavors or coloring agents. Sweeteners which may be used to supplement the solution include, for example, sucrose, corn syrup and high fructose corn syrup. If desired, the solution may be decolorized or otherwise purified, although such processing is generally not required.

In one embodiment of the invention the spent infusion solution drained from the fruit is directed to a holding tank and subjected to an enzyme treatment and decolorization. The enzyme treatment generally consists of adjusting the pH to about 5 to 6. If desired, pectic enzymes such as pectin methylesterases may be introduced into the solution at about 120° F. to 140° F. for about one to two hours. The decolorization treatment consists of contacting the partially spent infusion solution with an adsorbent such as activated carbon. After being decolorized, the spent solution is analyzed for the content of the desired components. If the solution is to be recycled, deficient components are replaced to fortify the solution. The infusion solution may then be recovered for use as a flavoring agent or as a sweetener.

In a further embodiment of the invention, the fruit may undergo an optional tenderizing process prior to immersing in the infusion solution. The tenderizing process consists of freezing and thawing the fruit under conditions that will create ice crystals capable of rupturing the cellular structure of the fruit.

Slow freezing will generally produce large ice crystals which will rupture more of the cell walls of the fruit thus creating a more tender product. Large crystals can also be produced by a process of freezing, increasing the temperature while still keeping the fruit frozen, and then decreasing the temperature of the fruit. The cycling of the temperature has the effect of increasing ice crystal size. A temperature of from about $-3°$ C. to $-20°$ C. or lower is sufficient for freezing the fruit. The fruit should be subjected to this temperature for at least about 0.1 hour and for preferably at least about 0.5 to twenty hours. The fruit can be subjected to one or more freeze-thaw sequences for the purpose of tenderizing.

The fruit can also be quickly frozen by blast freezing or cryogenic freezing. In blast freezing, a cold air stream at below about $-20°$ C. is passed over and around the fruit to quickly freeze the fruit. In cryogenic freezing, a cryogenic fluid such as liquid nitrogen is used to cool a chamber and the fruit to a low temperature. However in the quick freezing techniques the ice crystals formed in the fruits are smaller, with fewer cell walls being ruptured.

In the process of the invention the spent infusion solution contains many components extracted from the fruit being treated. The components which diffuse into the infusion solution from the fruit include, for example, the monosaccharides, pectins, flavors and colors. Substantial portions of the components of the fresh infusion solution including the acids, disaccharide and chelating agents diffuse into the fruit. The resulting spent infusion solution thus forms a desirable sweetener containing a substantial portion of the naturally occurring fruit sugars, flavors, pectins and other components. The resulting sweetener can be prepared from essentially any type of fruit including, for example, apples, bananas, pineapples, peaches, pears, plums, grapes, apricots, nectarines, strawberries, blueberries, raspberries and the like. The sweetener can be used for sweetening other products including, for example, fruits, beverages, jams, baked goods such as cookies, jellies and confectioneries. The sweetener may be used in the manner in which conventional liquid flavors, sweeteners and syrups are used.

The fruit extract solution has significant whipping characteristics and is particularly suitable for use in preparing confectionery products. The solution further has significant water binding capacity and ice crystal inhibiting characteristics. These characteristics enable the solution to be suitable for producing frozen novelties and other products. The solution is shelf stable at room temperature for extended periods of time.

The following examples demonstrate the preferred embodiment of the invention but are not intended to limit the scope of the invention. All temperatures are in Fahrenheit unless otherwise indicated.

EXAMPLE 1

A peach flavored extract was prepared from about 2300 pounds of fresh peaches. The peaches were first washed and then halved, peeled and depitted. The peaches were divided into seven parcels and placed in separate perforated baskets. The baskets were placed in a processing tank. The infusion solution was added to the processing tank to cover the fruit. The solution had the following composition:

| Component | Weight (Pounds) | Percent by Weight |
| --- | --- | --- |
| Water | 1176.84 | 47.04 |
| Sugar (sucrose) | 1249.45 | 50.00 |
| Citric Acid | 54.91 | 2.20 |
| Erythorbic Acid | 14.81 | 0.60 |
| Potassium Sorbate | 0.75 | 0.03 |
| Sodium Benzoate | 0.75 | 0.03 |
| Sodium Hexametaphosphate | 2.49 | 0.10 |
| | 2500.00 | 100.00 |

The peaches were immersed in the solution and held at about 200° F. for about 15 minutes. The solution and the peaches were sealed in the processing tank and the tank evacuated to about 29 inches of mercury for about 10 minutes. Thereafter the peaches and the solution were cooled to about 120° F. using an indirect heat exchanger. After cooling, the peaches and solution were returned to atmospheric pressure by releasing the vacuum. The peaches were separated from the solution and the solution was analyzed to determine the amount of the components infused into the fruit. To compensate for the loss of components in the solution, the solution was fortified with the following ingredients.

| Ingredient | Weight (Pounds) |
| --- | --- |
| Sugar (sucrose) | 450.00 |
| Citric Acid | 17.82 |
| Erythorbic Acid | 5.50 |
| Sodium Hexametaphosphate | 1.10 |
| Sodium Benzoate | 0.29 |
| Potassium Sorbate | 0.22 |
| | 474.93 |

The fortified solution was returned to the processing tank and a second 2300 pound batch of peaches were placed in the solution and processed as above. The process was repeated through four additional cycles. The resulting solution had an intense and distinctive peach flavor. The solution was cooled to about 70° F. and stored in containers.

EXAMPLE 2

An apricot flavored extract was prepared from about 1820 pounds of fresh apricots. The apricots were first washed and then halved and depitted. The apricots were divided into seven parcels and placed in separate perforated baskets. The baskets were placed in a processing tank. The infusion solution was added to the processing tank to cover the fruit. The solution had the following composition:

| Component | Weight (Pounds) | Percent by Weight |
| --- | --- | --- |
| Water | 1425.27 | 47.35 |
| Sugar (sucrose) | 1496.59 | 49.72 |
| Citric Acid | 65.78 | 2.19 |
| Erythorbic Acid | 17.58 | 0.58 |
| Potassium Sorbate | 0.90 | 0.03 |
| Sodium Benzoate | 0.90 | 0.03 |
| Sodium Hexametaphosphate | 2.98 | 0.10 |
| | 3010.00 | 100.00 |

The apricots were immersed in the solution and held at about 180° F. for about 15 minutes. The solution and the apricots were sealed in the processing tank and the tank evacuated to about 29 inches of mercury for about 10 minutes. Thereafter the apricots and the solution were cooled to about 120° F. using an indirect heat exchanger. After cooling, the apricots and solution were returned to atmospheric pressure by releasing the vacuum. The apricots were separated from the solution and the solution was analyzed to determine the amount of the components infused into the fruit. To compensate for the loss of components in the solution, the solution was fortified with the following ingredients:

| Ingredient | Weight (Pounds) |
| --- | --- |
| Sugar (sucrose) | 600.00 |
| Citric Acid | 18.04 |
| Erythorbic Acid | 4.40 |
| Sodium Hexametaphosphate | 2.40 |
| Sodium Benzoate | 0.44 |
| Potassium Sorbate | 0.44 |
| | 625.72 |

The fortified solution was returned to the processing tank and a second 1820 pound batch of apricots were placed in the solution and processed as above. The process was repeated through four additional cycles and batches of apricots. The resulting solution had an intense and distinctive apricot flavor. The solution was cooled to about 70° F. and stored in containers.

EXAMPLE 3

A pineapple flavored extract may be prepared from fresh pineapple. The pineapple is first washed and sliced into pieces. The pineapple pieces may be divided into seven parcels and placed in separate perforated baskets. The baskets are then placed in a processing tank. An infusion solution is added to the process tank to cover the fruit. The solution may have the following composition:

| Component | Percent by Weight |
| --- | --- |
| Water | 47.13 |
| Sugar (sucrose) | 50.00 |
| Citric Acid | 2.20 |
| Erythorbic Acid | 0.60 |
| Potassium Sorbate | 0.03 |
| Sodium Benzoate | 0.03 |
| Sodium Hexamethaphosphate | 0.01 |
| | 100.00 |

The pineapple is immersed in the solution and held at about 200° F. for about 15 minutes. The solution and the pineapple are sealed in the processing tank and the tank evacuated to about 29 inches of mercury for about 10 minutes. Thereafter the pineapple and the solution are cooled to about 120° F. using an indirect heat exchanger. After cooling, the pineapple and solution are returned to atmospheric pressure by releasing the vacuum. The pineapple is separated from the solution and the solution is analyzed to determine the amount of the components infused into the fruit. To compensate for the loss of components in the solution, the solution is fortified with sufficient amounts of the components to replace those consumed during the processing.

The fortified solution is then returned to the processing tank and a second batch of pineapple is placed in the solution and processed as above. The process is suitably repeated through four additional cycles. The resulting solution will have an intense and distinctive pineapple flavor. The solution may be cooled to about 70° F. and stored in containers.

What is claimed is:

1. A process for preparing a fruit flavored, aqueous extract solution comprising the steps of:
   (a) immersing a fruit in an aqueous infusion solution containing a reducing agent, an acid and at least one disaccharide and infusing the fruit at a temperature of about 120° F. to about 212° F. for a time sufficient to infuse the fruit and extract an effective amount of flavor components from the fruit and to produce a fruit-flavored solution;
   (b) separating the fruit from the solution; and
   (c) recovering the solution, wherein the solution contains fruit flavors, sugars, and extracted components from the fruit.

2. The process of claim 1 wherein said reducing agent is an acid selected from the group consisting of erythorbic acid, ascorbic acid, sulfurous acid, and salts thereof.

3. The process of claim 1 wherein said disaccharide is a non-reducing disaccharide.

4. The process of claim 1 wherein said disaccharide is sucrose, maltose, lactose or cellobiose.

5. The process of claim 1 wherein said fruit flavor extract contains monosaccharides extracted from the fruit.

6. The process of claim 1 wherein the fruit is infused for about 5 minutes to about 60 minutes.

7. The process of claim 1 wherein said reducing agent is present in the amount of about 0.1 percent by weight to about 2.5% by weight.

8. The process of claim 1 wherein said disaccharide is present in the amount of about 0.5% by weight to about 60 percent by weight.

9. The process of claim 1 wherein said fruit is subjected to a vacuum during said infusion step.

10. The process of claim 9 wherein said vacuum is about 15 inches to about 30 inches of mercury.

11. The process of claim 10 wherein said vacuum is applied for about 30 seconds to about 1 hour.

12. The process of claim 1 wherein said infusion solution further contains a chelating agent selected from the group consisting of EDTA, citric acid, phosphoric acid or a salt thereof, pyrophosphate, polyphosphate, and sodium hexametaphosphate.

13. The process of claim 1 wherein said infusion solution further contains an antimicrobial agent selected from the group consisting of benzoic acid, sorbic acid, propionic acid and salts thereof.

14. The process of claim 1 wherein said fruit is frozen and thawed prior to infusion with the infusion solution.

15. The process of claim 1 wherein said fruit is peeled and cut into predetermined size pieces before infusing with the infusion solution.

16. The process of claim 1 wherein said fruit is apple, banana, pineapple, peach, pear, plum, grape, apricot, nectarine, strawberry or blueberry.

17. The process of claim wherein said fruit flavor extract solution is concentrated after separation from the fruit.

18. The process of claim wherein the fruit flavor extract solution is decolorized after separation from the fruit.

19. The process of claim 1 comprising immersing a second fruit in the fruit flavor extract solution after the fruit of step (a) has been removed, and infusing the second fruit to extract flavors from the second fruit.

20. The process of claim 19 wherein said fruit flavor extract from step (c) is fortified with a disaccharide, acid or reducing agent before said second fruit is infused.

21. A fruit flavor extract prepared by the process of claim 1.

22. A process for preparing an aqueous fruit flavor extract solution comprising the steps of:
   (a) immersing a fruit in an aqueous infusion solution containing a reducing disaccharide, a reducing agent and an edible acid;
   (b) infusing the fruit with the infusion solution at a temperature of about 120° F. to about 212° F. for sufficient time to infuse the fruit and extract an effective amount of flavor components from the fruit;
   (c) removing the fruit from the solution;
   (d) selectively adjusting the disaccharide, edible acid and reducing agent concentration of the solution;
   (e) repeating steps (a) through (c) using additional fruit; and
   (f) recovering the solution; wherein said solution contains an effective amount of fruit flavor, sugar and components extracted from said fruit.

23. The process of claim 22 wherein said infusion step is conducted to extract an effective amount of pectins, color components and monosaccharides from the fruit.

24. The process of claim 22 comprising subjecting the fruit to a reduced pressure while immersed in the infusion solution.

25. The process of claim 24 comprising reducing the temperature of the fruit and infusion solution while at the reduced pressure.

26. The process of claim 24 wherein said fruit and infusion solution are maintained at a temperature of about 80° F. to about 180° F. for about 5 to about 30 minutes while at the reduced pressure.

27. The process of claim 24 further comprising gradually releasing the reduced pressure.

28. The process of claim 24 wherein said reduced pressure is about 15 to 30 inches of mercury.

29. The process of claim 22 wherein said fruit is selected from the group consisting of apples, bananas, pineapples, peaches, pears, plums, grapes, apricots, nectarines, blueberries, raspberries, and strawberries.

30. A process of preparing a fruit-flavored aqueous extract solution comprising the steps of:

(a) immersing a fruit in an aqueous infusion solution containing a reducing agent, an acid, and at least disaccharid and infusing the fruit at a temperature of about 60° F. to about 212° F.; and at atmospheric pressure.

(b) subjecting the fruit to a vacuum while immersered in the infusion solution for sufficient time infuse the fruit and extract an effective amount of flavor component's from the fruit and to produce a fruit-flavored solution;

(c) separating the fruit from the solution; and (d) recovering the fruit-flavored solution.

31. The process of claim 30 wherein the fruit is subjected to a vacuum of about 1 to about 30 inches of mercury.

32. The process of claim 30 wherein the temperature of the solution is reduced to less than about 180° F. before subjecting the fruit to the vacuum.

33. The process of claim 30 wherein the fruit is infused at atmospheric pressure for about 5 to 60 minutes.

34. The process of claim 30 wherein the fruit is infused under said vacuum for about 5 to about 60 minutes.

* * * * *

UNITED STATES PATENT AND TRADEMARK OFFICE
CERTIFICATE OF CORRECTION

PATENT NO. : 4,996,070

DATED : February 26, 1991

INVENTOR(S) : Karim Nafisi-Movaghar

It is certified that error appears in the above-identified patent and that said Letters Patent is hereby corrected as shown below:

Column 14, line 35, following "claim", insert --1--.

Column 14, line 38, following "claim", insert --1--.

Signed and Sealed this

First Day of September, 1992

Attest:

DOUGLAS B. COMER

*Attesting Officer*  *Acting Commissioner of Patents and Trademarks*